United States Patent
Miyauchi

(10) Patent No.: US 7,941,189 B2
(45) Date of Patent: May 10, 2011

(54) COMMUNICATING ROAD NOISE CONTROL SYSTEM, IN-VEHICLE ROAD NOISE CONTROLLER, AND SERVER

(75) Inventor: Hideo Miyauchi, Obu (JP)

(73) Assignee: Denso Corporation, Kariya (JP)

( * ) Notice: Subject to any disclaimer, the term of this patent is extended or adjusted under 35 U.S.C. 154(b) by 671 days.

(21) Appl. No.: 12/012,968

(22) Filed: Feb. 6, 2008

(65) Prior Publication Data

US 2008/0188271 A1   Aug. 7, 2008

(30) Foreign Application Priority Data

Feb. 7, 2007 (JP) .................................. 2007-027959
Nov. 27, 2007 (JP) .................................. 2007-305898

(51) Int. Cl.
    *H04M 1/00* (2006.01)
(52) U.S. Cl. ........................ 455/569.2; 455/570; 704/226
(58) Field of Classification Search .... 455/414.1–414.2, 455/456.1, 456.3, 569.1–569.2, 575.9, 570; 704/226; 379/392.01; 381/94.1
See application file for complete search history.

(56) References Cited

U.S. PATENT DOCUMENTS 5,930,749 A * 7/1999 Maes ............................. 704/228
2005/0187763 A1 * 8/2005 Arun ............................. 704/226

FOREIGN PATENT DOCUMENTS

| JP | 09-062980 | 3/1997 |
| JP | 10-210131 | 8/1998 |
| JP | 2003-344083 | 12/2003 |

* cited by examiner

*Primary Examiner* — Christian A Hannon
(74) *Attorney, Agent, or Firm* — Harness, Dickey & Pierce, PLC

(57) ABSTRACT

Road noise is reduced without locally storing noise spectrum patterns for determination or without detecting the present position of a vehicle from the device. An in-vehicle hands-free device causes a cellular phone to detect the present position of the vehicle and transmit the position to a server. The server determines a noise spectrum pattern corresponding to the road surface on which the vehicle is presently running. The noise spectrum pattern is based on the present position of the vehicle received from the in-vehicle hands-free device and road information. The server transmits the noise spectrum pattern to the in-vehicle hands-free device whereupon a noise canceling signal is superimposed on a received signal. The noise canceling signal is based on an inverted noise spectrum pattern that is obtained by inverting the phase of the noise spectrum pattern. The resulting composite signal is output from a speaker.

14 Claims, 11 Drawing Sheets

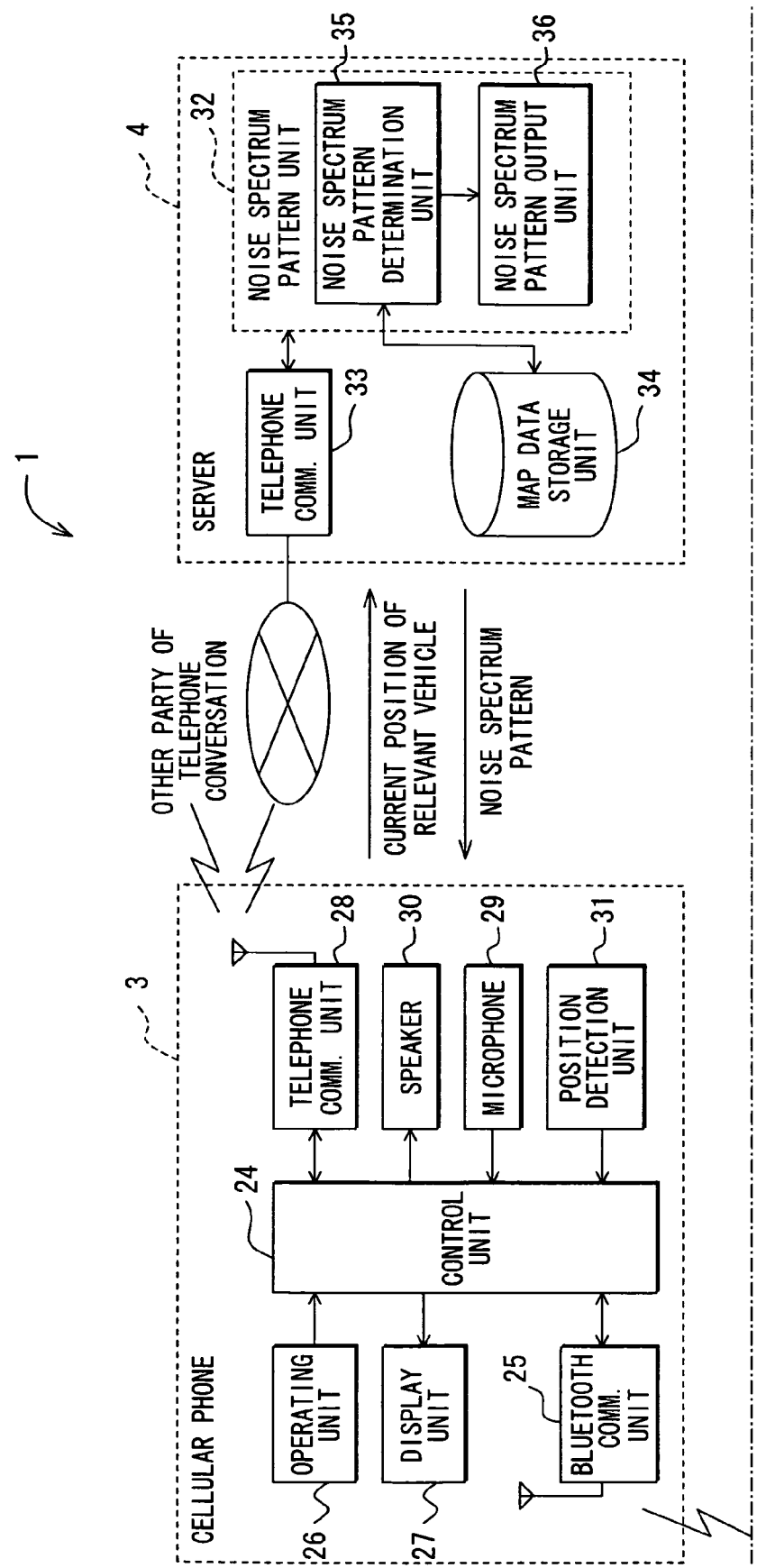

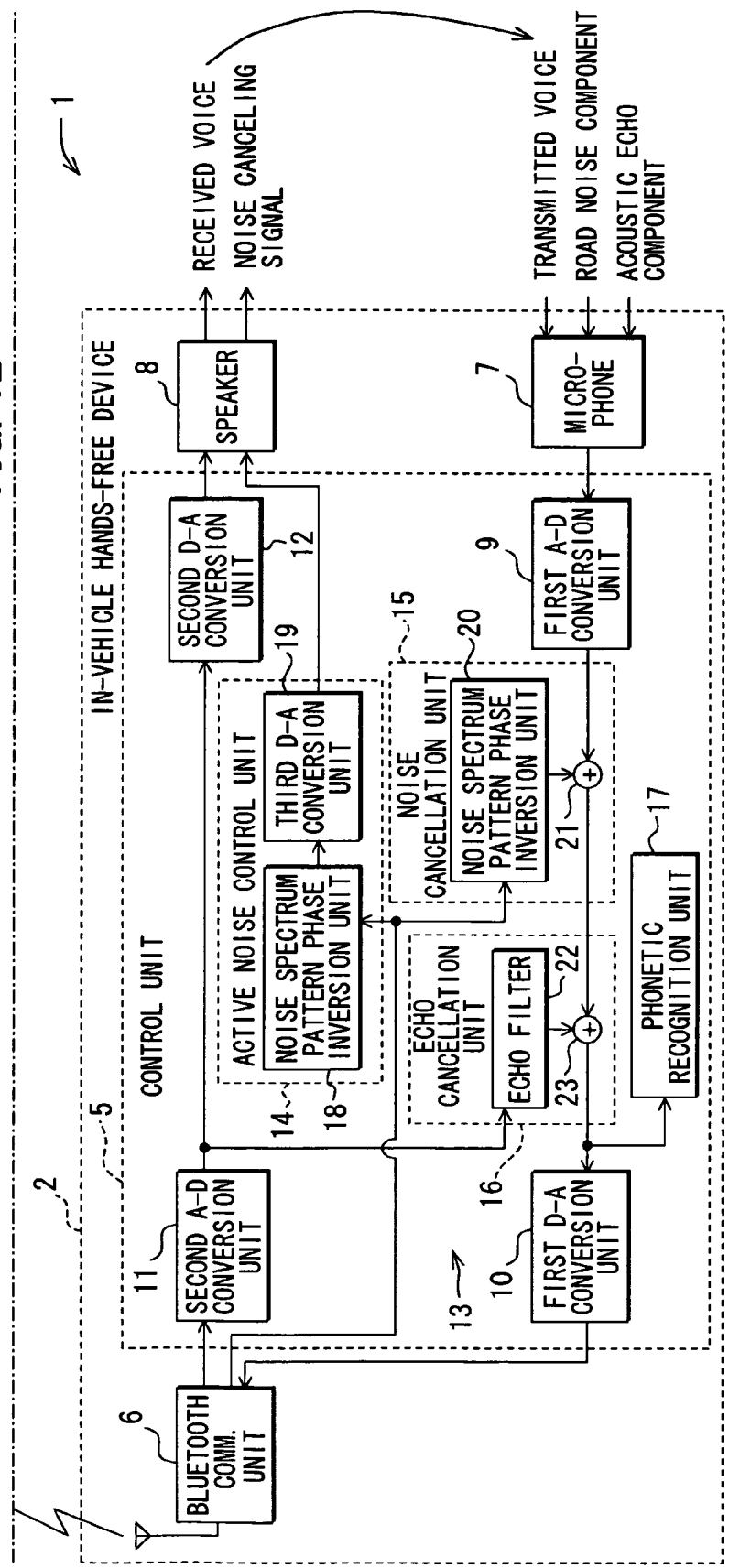

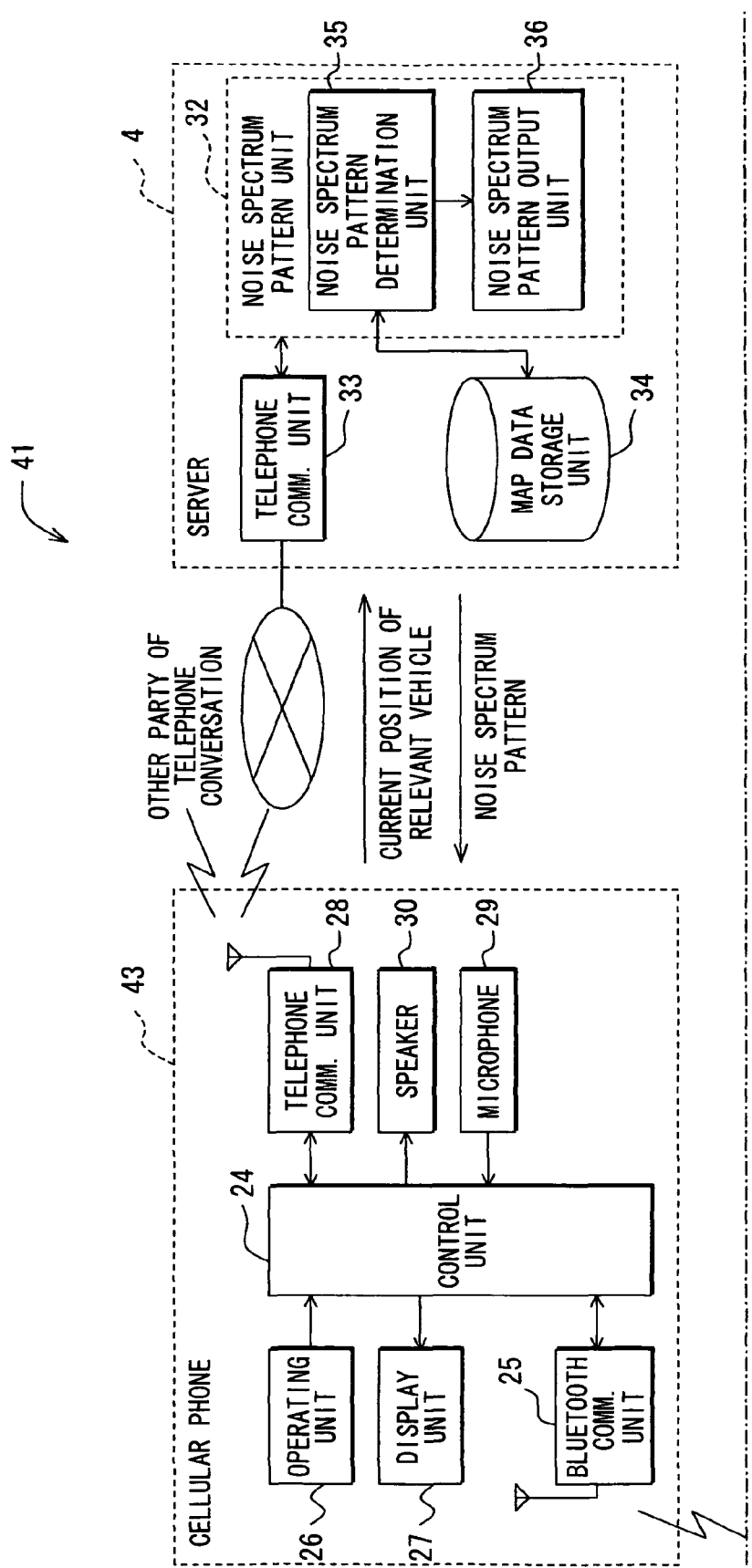

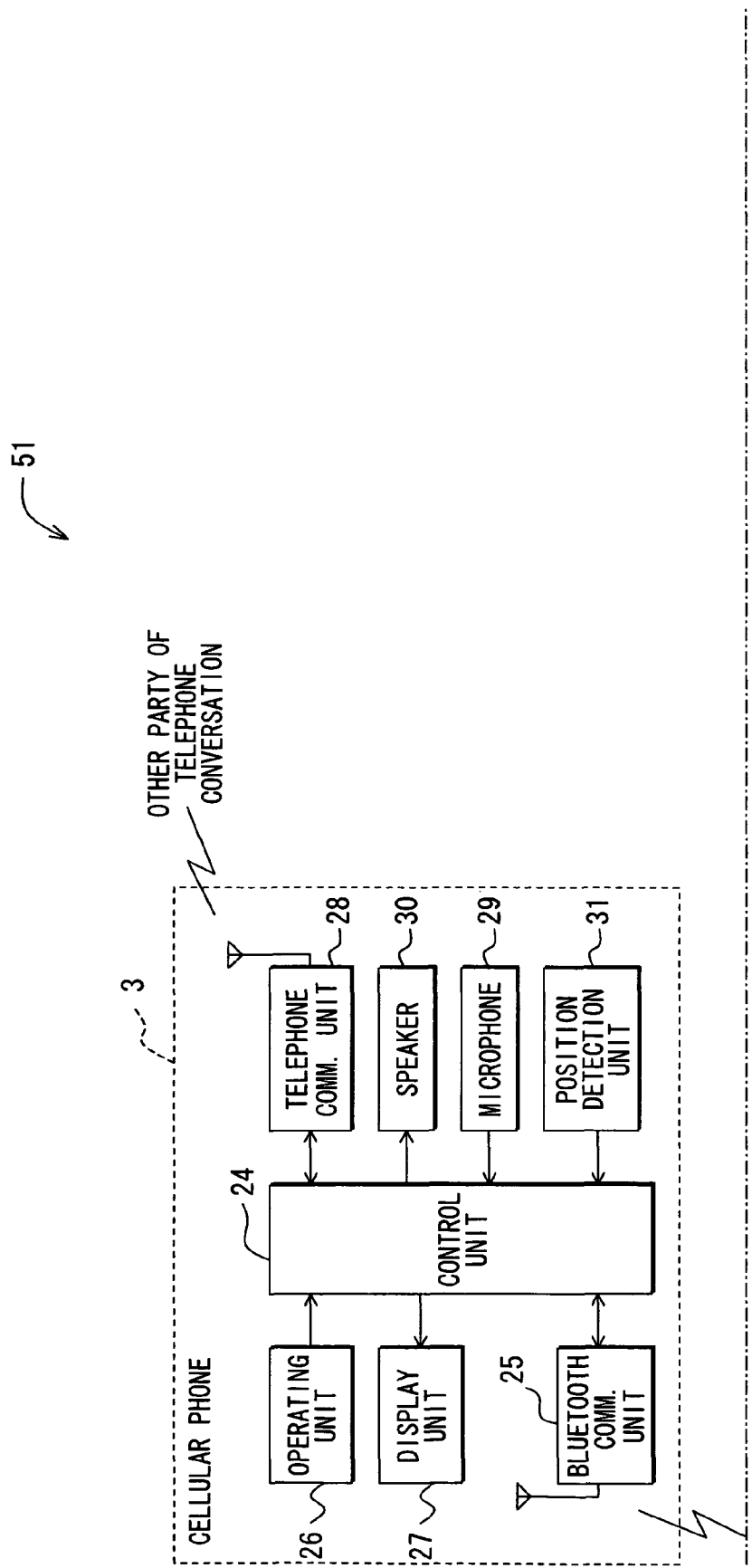

| FIG. 5A |
|---|
| FIG. 5B | ns # COMMUNICATING ROAD NOISE CONTROL SYSTEM, IN-VEHICLE ROAD NOISE CONTROLLER, AND SERVER

CROSS REFERENCE TO RELATED APPLICATIONS

The present invention is based on and claims priority to Unpublished Japanese Patent Application No. 2007-027959 filed on Feb. 7, 2007 and Unpublished Japanese Patent Application No. 2007-305898 filed on Nov. 27, 2007, the contents of both of which are incorporated in their entirety herein.

BACKGROUND OF THE INVENTION

1. Field of the Invention

The present invention is related to a road noise control system, and more specifically to an in-vehicle road noise controller and a server communicating through a communication network.

2. Description of Related Art

Various technologies have been developed to facilitate an environment for a hands-free telephone conversation carried out in a vehicle compartment. One technology involves determining a noise spectrum pattern corresponding to the road surface on which a vehicle is presently running based on the present position of the vehicle and road information. The determined noise spectrum pattern is selected from among multiple different noise spectrum patterns stored in correspondence with multiple different road surfaces and is outputted. Road noise is reduced based on the outputted noise spectrum pattern as described, for example, in JP-A-2003-344083.

However, the apparatus described in JP-A-2003-344083 detects the present position of the vehicle. Therefore, the noise control in the apparatus cannot be implemented independently, that is, without detecting the present position of the vehicle. The apparatus stores multiple different noise spectrum patterns corresponding to multiple different road surfaces, and determines a noise spectrum pattern corresponding to the road surface on which the vehicle is presently running from among the different noise spectrum patterns. Therefore, a very large memory is required to store noise spectrum patterns. Further, the amount of storable noise spectrum patterns is thereby limited to the available storage space and the size of the noise spectrum patterns.

The invention has been made in consideration of the foregoing. Therefore, it is an object of the invention to provide a communicating road noise control system, an in-vehicle road noise controller, and a server wherein road noise can be appropriately reduced even when a function of detecting the present position of a vehicle or a function of storing noise spectrum patterns for determination is not provided.

According to a first aspect, the communicating road noise control system is provided with an in-vehicle road noise controller. A present position detection and transmission instructing means causes an external device to detect the present position of the vehicle and transmit the present position to the server. In the server, a present position receiving means receives the present position from the external device. A noise spectrum pattern determining means (hereinafter "determining means") determines a noise spectrum pattern corresponding to the road surface on which the vehicle is presently running based on the received present position of the vehicle and road information stored in a map data storing means. A noise spectrum pattern outputting means selects the noise spectrum pattern determined by the determining means from among multiple different noise spectrum patterns stored in correspondence with multiple different road surfaces and outputs the selected pattern. A noise spectrum pattern transmitting means transmits the outputted noise spectrum pattern to the in-vehicle road noise controller. In the in-vehicle road noise controller, a noise spectrum pattern receiving means receives the noise spectrum pattern from the server. A road noise reducing means reduces road noise based on the received noise spectrum pattern.

Thus, the present position of the vehicle is detected by the external device, not by the in-vehicle road noise controller. The multiple different noise spectrum patterns corresponding to multiple different road surfaces are stored in the server, not in the in-vehicle road noise controller. Further, of the multiple different noise spectrum patterns, a noise spectrum pattern corresponding to the road surface on which the vehicle is presently running is determined by the server, not by the in-vehicle road noise controller. Thus, road noise can be appropriately reduced even in an in-vehicle controller that does not detect the present position of the vehicle or that does not store noise spectrum patterns for determination. Since the multiple different noise spectrum patterns corresponding to multiple different road surfaces are stored in the server, a large storage capacity can be ensured for noise spectrum patterns. Further, updated noise spectrum patterns can be provided to the server, for example, from external sources, independently of the operation of the in-vehicle controller.

In accordance with a second aspect of the in-vehicle road noise controller, a present position detection and transmission instructing means causes an external device to detect the present position of the vehicle and causes the external device to transmit it to the server. When a noise spectrum pattern receiving means receives a noise spectrum pattern from the server, a road noise reducing means reduces road noise based on the received noise spectrum pattern.

When the in-vehicle road noise controller is used in the communicating road noise control system together with the server described in accordance with a sixth aspect, the same action and effect as described in the first aspect can be obtained. That is, road noise can be appropriately reduced even with an in-vehicle controller construction that does not have a function of detecting the present position of the vehicle or a function of storing noise spectrum patterns for determination.

According a third aspect of the communicating road noise control system, in the in-vehicle road noise controller, a present position detecting means detects the present position of the vehicle. A present position transmitting means transmits the detected present position of the vehicle to the server. In the server, a present position receiving means receives the present position of the vehicle from the in-vehicle road noise controller. The determining means then determines a noise spectrum pattern corresponding to the road surface on which the vehicle is presently running based on the received present position of the vehicle and road information stored in a map data storing means. A noise spectrum pattern outputting means selects the noise spectrum pattern determined by the determining means from among the multiple different noise spectrum patterns stored in correspondence with multiple different road surfaces and outputs the selected pattern. A noise spectrum pattern transmitting means transmits the outputted noise spectrum pattern to the in-vehicle road noise controller. In the in-vehicle road noise controller, a noise spectrum pattern receiving means receives the noise spectrum pattern from the server. Then, a road noise reducing means reduces road noise based on the received noise spectrum pattern.

Thus, the multiple different noise spectrum patterns corresponding to multiple different road surfaces are stored in the server, not in the in-vehicle road noise controller. Further, of the multiple different noise spectrum patterns, a noise spectrum pattern corresponding to the road surface on which the vehicle is presently running is determined by the server, not by the in-vehicle road noise controller. Thus, road noise can be appropriately reduced even with a construction that does not have a function of storing noise spectrum patterns for determination.

According to the in-vehicle road noise controller described in a fourth aspect, a present position detecting means detects the present position of the vehicle. A present position transmitting means transmits the detected present position of the vehicle to the server. A noise spectrum pattern receiving means receives a noise spectrum pattern from the server. Then, a road noise reducing means reduces road noise based on the received noise spectrum pattern.

Thus, when the in-vehicle road noise controller is used in the communicating road noise control system together with the server described in a seventh aspect, the same action and effect as described in the third aspect can be obtained. That is, road noise can be appropriately reduced even with a construction that does not have a function of storing noise spectrum patterns for determination.

According to the in-vehicle road noise controller described in a fifth aspect, a present position acquiring means acquires the present position of the vehicle from an external device. A noise spectrum pattern determining means (hereinafter "determining means") determines a noise spectrum pattern corresponding to the road surface on which the vehicle is presently running based on the acquired present position of the vehicle and road information stored in a map data storing means. A noise spectrum pattern outputting means selects the noise spectrum pattern determined by the determining means from among the multiple different noise spectrum patterns stored in correspondence with multiple different road surfaces and outputs the selected pattern. A road noise reducing means reduces road noise based on the received noise spectrum pattern.

Thus, the present position of the vehicle is acquired from the external device, not detected by the in-vehicle road noise controller. Therefore, road noise can be appropriately reduced even with a construction that does not have a function of detecting the present position of the vehicle.

According to the communicating road noise control system described in an eight aspect, in the in-vehicle road noise controller, a present position detection and transmission instructing means causes an external device to detect the present position of the vehicle and causes the external device to transmit it to the server. A noise spectrum pattern transmitting means transmits a noise spectrum pattern to the server. In the server, a present position receiving means receives the present position of the vehicle from the external device. A noise spectrum pattern receiving means receives a noise spectrum pattern from the in-vehicle road noise controller. Then, a noise spectrum pattern optimizing means analyzes the received noise spectrum pattern to cancel a non-stationary component with a stationary component left and thereby optimizes the noise spectrum pattern. A noise spectrum pattern determining means determines a noise spectrum pattern corresponding to the road surface on which the vehicle is presently running. The above noted determination is carried out based on the present position of the vehicle received by the present position receiving means and road information stored in a map data storing means. A noise spectrum pattern outputting means stores multiple different noise spectrum patterns optimized by the noise spectrum pattern optimizing means in correspondence with multiple different road surfaces. Further, it selects the noise spectrum pattern determined by the determining means from among the multiple different noise spectrum patterns and outputs the selected pattern. A noise spectrum pattern transmitting means transmits the outputted noise spectrum pattern to the in-vehicle road noise controller. In the in-vehicle road noise controller, a noise spectrum pattern receiving means receives the noise spectrum pattern from the server. Then, a road noise reducing means reduces road noise based on the received noise spectrum pattern.

Thus, the same action and effect as described in the first aspect can be obtained. The present position of the vehicle is detected by the external device, not by the in-vehicle road noise controller. The multiple different noise spectrum patterns corresponding to multiple different road surfaces are stored in the server, not in the in-vehicle road noise controller. Further, of the multiple different noise spectrum patterns, a noise spectrum pattern corresponding to the road surface on which the vehicle is presently running is determined by the server, not by the in-vehicle road noise controller. Thus, road noise can be appropriately reduced even with a construction that does not have a function of detecting the present position of the vehicle or a function of storing noise spectrum patterns for determination. Since the multiple different noise spectrum patterns corresponding to multiple different road surfaces are stored in the server, a large storage capacity can be ensured for noise spectrum patterns. Since a noise spectrum pattern with a stationary component left and a non-stationary component canceled is transmitted to the in-vehicle road noise controller, it is possible to more appropriately reduce road noise and thus enhance accuracy.

According to the in-vehicle road noise controller described in a ninth aspect, a present position detection and transmission instructing means causes an external device to detect the present position of the vehicle and causes the external device to transmit it to the server. A noise spectrum pattern transmitting means transmits a noise spectrum pattern to the server. A noise spectrum pattern receiving means receives a noise spectrum pattern from the server. Then, a road noise reducing means reduces road noise based on the received noise spectrum pattern.

Thus, when the in-vehicle road noise controller is used in the communicating road noise control system together with the server described in a twelfth aspect, the same action and effect as described in the first aspect can be obtained. That is, road noise can be appropriately reduced even with a construction that does not have a function of detecting the present position of the vehicle or a function of storing noise spectrum patterns for determination. Since a noise spectrum pattern with a stationary component left and a non-stationary component canceled is transmitted to the in-vehicle road noise controller, it is possible to more appropriately reduce road noise and thus enhance accuracy.

According to the communicating road noise control system described in a tenth aspect, in the in-vehicle road noise controller, a present position detecting means detects the present position of the vehicle. A present position transmitting means transmits the detected present position of the vehicle to the server. A noise spectrum pattern transmitting means transmits a noise spectrum pattern to the server. In the server, a present position receiving means receives the present position of the vehicle from the in-vehicle road noise controller and a noise spectrum pattern receiving means receives a noise spectrum pattern from the in-vehicle road noise controller. Then, a noise spectrum pattern optimizing means analyzes the received noise spectrum pattern to cancel a non-stationary component with a stationary component left and thereby optimizes the noise spectrum pattern. A noise spectrum pattern determining means (hereinafter "determining means") determines a noise spectrum pattern corresponding to the road surface on which the vehicle is presently running. The above described determination is carried out based on the present position of the vehicle received by the present position receiving means and road information stored in a map data storing means. A noise spectrum pattern outputting means stores multiple different noise spectrum patterns optimized by the noise spectrum pattern optimizing means in correspondence with multiple different road surfaces. Further, it selects the noise spectrum pattern determined by the determining means from among the multiple different noise spectrum patterns and outputs the selected pattern. A noise spectrum pattern transmitting means transmits the outputted noise spectrum pattern to the in-vehicle road noise controller. In the in-vehicle road noise controller, a noise spectrum pattern receiving means receives the noise spectrum pattern from the server. Then, a road noise reducing means reduces road noise based on the received noise spectrum pattern.

Thus, the same action and effect as described in the third aspect can be obtained. The multiple different noise spectrum patterns corresponding to multiple different road surfaces are stored in the server, not in the in-vehicle road noise controller. Further, of the multiple different noise spectrum patterns, a noise spectrum pattern corresponding to the road surface on which the vehicle is presently running is determined by the server, not by the in-vehicle road noise controller. Thus, road noise can be appropriately reduced even with a construction that does not have a function of storing noise spectrum patterns for determination. Since a noise spectrum pattern with a stationary component left and a non-stationary component canceled is transmitted to the in-vehicle road noise controller, it is possible to more appropriately reduce road noise and thus enhance accuracy.

According to the in-vehicle road noise controller described in an eleventh aspect, a present position detecting means detects the present position of the vehicle. A present position transmitting means transmits the detected present position of the vehicle to the server. A noise spectrum pattern transmitting means transmits a noise spectrum pattern to the server. A noise spectrum pattern receiving means receives a noise spectrum pattern from the server. Then, a road noise reducing means reduces road noise based on the received noise spectrum pattern.

Thus, when the in-vehicle road noise controller is used in the communicating road noise control system together with the server described in a thirteenth aspect, the same action and effect as described in the third aspect can be obtained. That is, road noise can be appropriately reduced even with a construction that does not have a function of storing noise spectrum patterns for determination. Since a noise spectrum pattern with a stationary component left and a non-stationary component canceled is transmitted to the in-vehicle road noise controller, it is possible to more appropriately reduce road noise and thus enhance accuracy.

According to the communicating road noise control system described in a fourteenth aspect, in the in-vehicle road noise controller, an additional information acquiring means acquires additional information that can have influence on noise spectrum patterns. A noise spectrum pattern transmitting means transmits a noise spectrum pattern affixed with the additional information acquired by the additional information acquiring means to the server. Thus, a noise spectrum pattern affixed with additional information that can have influence on noise spectrum patterns is transmitted to the server and the server considers the additional information received from the in-vehicle road noise controller. Thus, it is possible to select the noise spectrum pattern most suitable for reducing road noise and thus enhance accuracy.

According to the in-vehicle road noise controller described in a fifteenth aspect, an additional information acquiring means acquires additional information that can have influence on noise spectrum patterns. A noise spectrum pattern transmitting means transmits a noise spectrum pattern affixed with the additional information acquired by the additional information acquiring means to the server. Thus, a noise spectrum pattern affixed with additional information that can have influence on noise spectrum patterns is transmitted to the server and the server considers the additional information received from the in-vehicle road noise controller. Thus, it is possible to select the noise spectrum pattern most suitable for reducing road noise and thereby enhance accuracy.

According to the in-vehicle road noise controller described in a nineteenth aspect or a twenty-third aspect, a noise canceling means superimposes a noise canceling signal on a transmit signal to cancel a road noise component from the transmit signal. The above described noise canceling signal is based on an inverted noise spectrum pattern obtained by inverting the phase of a noise spectrum pattern received by a noise spectrum pattern receiving means. Therefore, a high-quality transmit signal with a road noise component canceled can be transmitted to the other party of telephone conversation.

According to the in-vehicle road noise controller described in a twenty-seventh aspect, a noise canceling means superimposes a noise canceling signal on a transmit signal to cancel a road noise component from the transmit signal. The above described noise canceling signal is based on an inverted noise spectrum pattern obtained by inverting the phase of a noise spectrum pattern outputted by a noise spectrum pattern outputting means. Therefore, a high-quality transmit signal with a road noise component canceled can be transmitted to the other party of telephone conversation.

According to the in-vehicle road noise controller described in a twenty-eighth aspect, a phonetic recognition means phonetically recognizes a transmit signal with a road noise component canceled by a noise canceling means. Therefore, it is possible to phonetically recognize a high-quality transmit signal and enhance a phonetic recognition rate.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 1 is a block diagram illustrating system components in accordance with a first exemplary embodiment;

DETAILED DESCRIPTION OF THE EXEMPLARY EMBODIMENTS

First Embodiment

Figure 2:
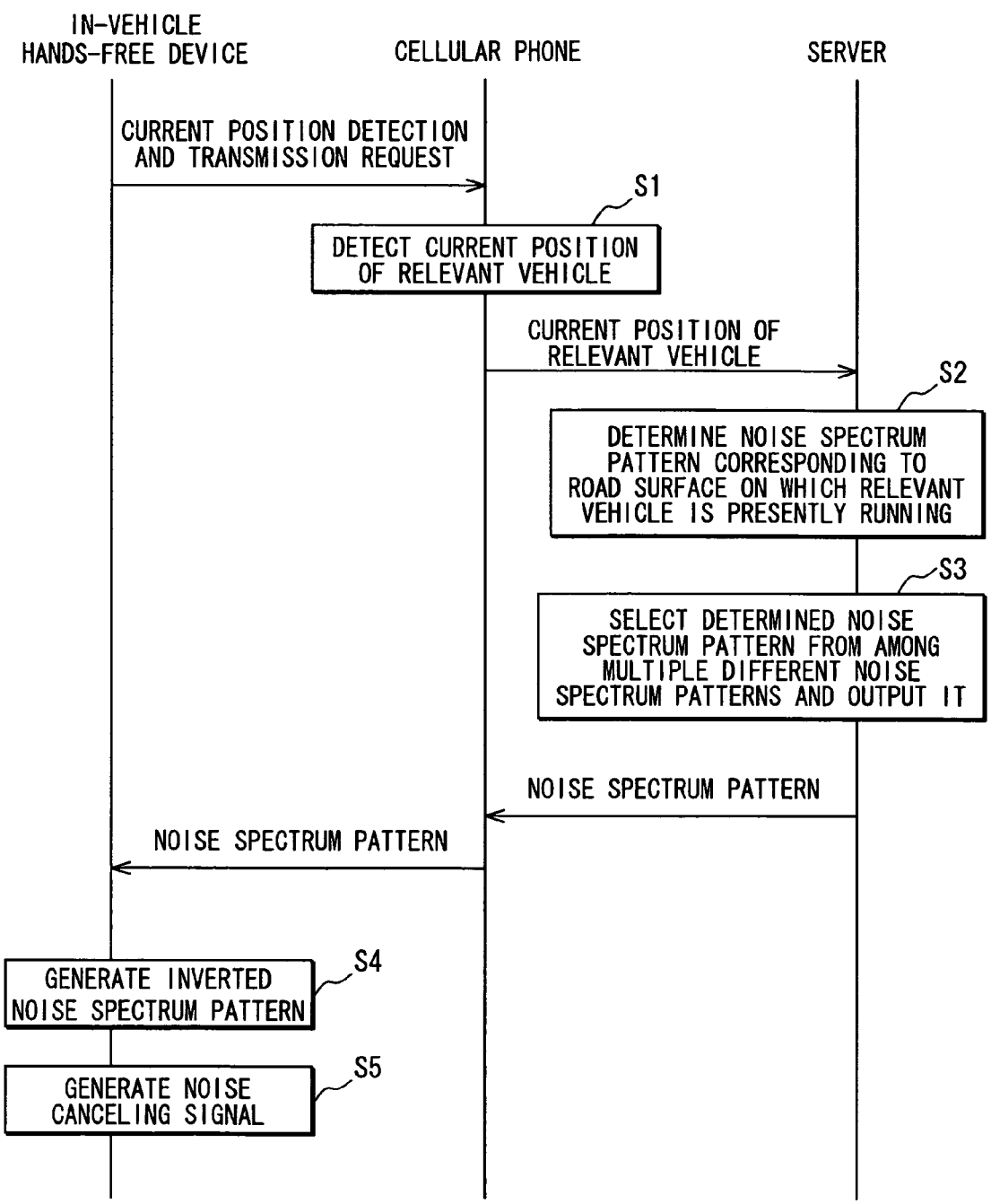
FIG. 2 is an operational flow diagram illustrating an exemplary sequence of operation in accordance with various embodiments.

Hereafter, description will be given to a first embodiment of the invention with reference to FIG. 1 and FIG. 2. FIG. 1 illustrates the overall configuration of a communicating road noise control system in the form of functional block diagram. In accordance with the communicating road noise control system 1, an in-vehicle hands-free device 2 and a cellular phone 3 can communicate with each other via, for example, a Bluetooth® or similar short range or proximity-based protocol; and the cellular phone 3 and the server 4 can communicate with each other in a wide area via a wide area network. It should be noted that the in-vehicle hands-free device can refer to and include the in-vehicle road noise controller and the cellular phone can refer to telephone means and external device in accordance with the invention as described herein.

The in-vehicle hands-free device 2 can include a control unit 5 for carrying out for example, present position detection and acting as the transmission instructing means as described herein, a Bluetooth® communication unit 6, which can act as the noise spectrum pattern receiving means as described herein, a microphone 7, which can act as the voice inputting means as described herein, and a speaker 8, which can act as the voice outputting means as described herein. The control unit 5 includes a microcomputer, such as a general, purpose computer, special purpose computer, application specific integrated circuit (ASIC), logic array, processor, controller, or the like, which has CPU, ROM, RAM, I/O, interconnected with a bus line. The microphone 7 is placed in proximity to the driver in the vehicle compartment, and is disposed in, for example, the headrest of the seat, the steering wheel, the sun visor, or the like. The speaker 8 is disposed in, for example, the instrument panel in the vehicle compartment, the ceiling of the vehicle interior, the front seat door, or the like.

The control unit 5 includes a first A-D conversion unit 9 and a first D-A conversion unit 10 in a transmitter system and a second A-D conversion unit 11 and a second D-A conversion unit 12 in a receiver system. In the present embodiment, the first A-D conversion unit 9, first D-A conversion unit 10, second A-D conversion unit 11, and second D-A conversion unit 12 construct a voice relaying means 13. Further, the control unit 5 includes an active noise control unit 14, which can act as the road noise reducing means and active noise controlling means as described herein, a noise cancellation unit 15, which can act as the noise canceling means as described herein, an echo cancellation unit 16; and a phonetic recognition unit 17, which can act as the phonetic recognition means as described herein. It will be appreciated that by voice signal herein, for example in the context of the microphone 7, reference can be made to a voice frequency signal that may contain a voice signal and may also contain other components within the frequency range of the microphone such as road noise or other noise falling within the voice frequency spectrum of the microphone.

The active noise control unit 14 includes a noise spectrum pattern phase inversion unit 18 (hereinafter "phase inversion unit 18") and a third D-A conversion unit 19. When the phase inversion unit 18 receives a noise spectrum pattern from the server 4 by the Bluetooth® communication unit 6 via the cellular phone 3, the phase of the received noise spectrum pattern is advanced or delayed by 180 degrees. An inverted noise spectrum pattern is thereby generated by inverting the phase of the noise spectrum pattern and outputting the inverted pattern to the third D-A conversion unit 19. When an inverted noise spectrum pattern is inputted from the phase inversion unit 18, the third D-A conversion unit 19 converts the inputted inverted noise spectrum pattern from digital signal to analog signal to generate a noise canceling signal. The generated noise canceling signal is output to the speaker 8. That is, the active noise control unit 14 superimposes on the received voice signal, a noise canceling signal having a phase opposite that of a road noise component present in the vehicle compartment. The active noise control unit outputs the composite signal, that is, the noise canceling signal plus road noise, to the speaker 8 to produce the active noise control effect.

The noise cancellation unit 15 includes a noise spectrum pattern phase inversion unit 20 (hereinafter "phase inversion unit 20") and a first adder 21. The phase inversion unit 20 operates similarly with the above-mentioned phase inversion unit 18 in that, when a noise spectrum pattern is received from the server 4 by the Bluetooth® communication unit 6 via the cellular phone 3, the phase inversion unit 20 advances or delays the phase of the received noise spectrum pattern by 180 degrees thereby generating an inverted noise spectrum pattern. The inverted pattern is then output to the first adder 21. That is, the noise cancellation unit 15 superimposes on the transmit signal, a noise canceling signal having a phase opposite that of a road noise component present in the vehicle compartment. The noise cancellation unit thereby cancels the road noise component inputted from the microphone 7.

The echo cancellation unit 16 includes an echo filter 22 and a second adder 23, and cancels an acoustic echo component inputted from the microphone 7. The phonetic recognition unit 17 phonetically recognizes a transmit signal with a road noise component canceled by the noise cancellation unit 15 and an acoustic echo component canceled by the echo cancellation unit 16.

The cellular phone 3 includes a control unit 24, a Bluetooth® communication unit 25, an operating unit 26, a display unit 27, a telephone communication unit 28, a microphone 29, a speaker 30, and a position detection unit 31. The position detection unit 31 includes, for example, a global positioning system (GPS) receiver that computes GPS signals to detect the present position. By operation of the control unit 24, when a present position detection and transmission request is inputted from the in-vehicle hands-free device 2, the position detection unit 31 detects the present position and the telephone communication unit 28 transmits the detected present position as the present position of the vehicle to the server 4. When a noise spectrum pattern is received by the control unit 24 from the server 4 by the telephone communication unit 28, the Bluetooth® communication unit 25 is directed to transmit the received noise spectrum pattern to the in-vehicle hands-free device 2.

The server 4 includes a noise spectrum pattern unit 32, a telephone communication unit 33, which can act as for example, a present position receiving means and noise spectrum pattern transmitting means in accordance with the invention, and a map data storage unit 34 map data storing means in the invention. The noise spectrum pattern unit 32 includes a noise spectrum pattern determination unit 35, which can act as noise spectrum pattern determining means in accordance with the invention and a noise spectrum pattern output unit 36, which can act as noise spectrum pattern outputting means in accordance with the invention.

The map data storage unit 34 stores road information. When the noise spectrum pattern determination unit 35 receives the present position of the vehicle from the cellular phone 3 by the telephone communication unit 33, a noise spectrum corresponding to the road surface on which the vehicle is presently running is determined. The above described determination is carried out based on the received present position of the vehicle and road information stored in the map data storage unit 34. The noise spectrum pattern output unit 36 stores multiple different noise spectrum patterns in correspondence with multiple different road surfaces. It selects the noise spectrum pattern determined by the noise spectrum pattern determination unit 35 from among the multiple different noise spectrum patterns and outputs the selected pattern to the telephone communication unit 33. When the noise spectrum pattern is inputted from the noise spectrum pattern output unit 36, the telephone communication unit 33 transmits the inputted noise spectrum pattern to the cellular phone 3.

Description will be given to the action of the above construction with reference to FIG. 2. When the user starts phonetic recognition or a hands-free telephone call, for example, the in-vehicle hands-free device 2 receives a noise spectrum pattern from the server 4 via the cellular phone 3 and generates a noise canceling signal as will be described in detail herein after.

The in-vehicle hands-free device 2 transmits a present position detection and transmission request to the cellular phone 3. When the cellular phone 3 receives the present position detection and transmission request from the in-vehicle hands-free device 2, the present position of the vehicle is detected at S1. Then, the detected present position of the vehicle is transmitted to the server 4.

When the server 4 receives the present position of the vehicle from the cellular phone 3, a noise spectrum corresponding to the road surface on which the vehicle is presently running is determined at S2. The above described determination is carried out based on the received present position of the vehicle and road information stored in the map data storage unit 34. The server then selects the determined noise spectrum pattern from among multiple different noise spectrum patterns stored in correspondence with multiple different road surfaces and outputs the selected pattern at S3. The outputted noise spectrum pattern is then transmitted to the cellular phone 3.

When the cellular phone 3 receives the noise spectrum pattern from the server 4, the received noise spectrum pattern is transmitted to the in-vehicle hands-free device 2 whereupon the received noise spectrum pattern is input to the active noise control unit 14 and the noise cancellation unit 15. The in-vehicle hands-free device 2 inverts the phase of the noise spectrum pattern at the active noise control unit 14 and the noise cancellation unit 15 to generate the above mentioned inverted noise spectrum pattern at S4. The in-vehicle hands-free device generates a noise canceling signal based on the generated inverted noise spectrum pattern at S5.

When a transmitted voice signal, a road noise component, and an acoustic echo component are inputted as a transmit signal from the microphone 7, the following operations can take place in the in-vehicle hands-free device 2. The control unit 5 converts the inputted transmit signal from analog signal to digital signal at the first A-D conversion unit 9, and superimposes a noise canceling signal generated by the noise cancellation unit 15 on the transmit signal in order to cancel the road noise component. The control unit 5 then cancels the acoustic echo component at the echo cancellation unit 16, and converts the digital signal into an analog signal at the first D-A conversion unit 10. The control unit 5 then causes the Bluetooth® communication unit 6 to transmit a transmit signal approximated to the transmitted voice to the other party of telephone conversation via the cellular phone 3.

When the control unit 5 receives a signal from the other party of telephone conversation by the Bluetooth® communication unit 6 via the cellular phone 3, the received signal is converted from analog signal to digital signal at the second A-D conversion unit 11, converts the digital signal into an analog signal at the second D-A conversion unit 12, and outputs the analog signal as a received voice signal to the speaker 8. In the above described case, the control unit 5 superimposes a noise canceling signal generated by the active noise control unit 14 on the received voice and outputs the composite signal to the speaker 8.

Thus, with respect to received voice, a noise canceling signal generated by the active noise control unit 14 is superimposed on the received voice and it is outputted to the speaker 8. Thus, a road noise component present in the vehicle compartment can be canceled. With respect to a transmitted voice signal, a noise canceling signal generated by the noise cancellation unit 15 is superimposed on the transmit signal. Thus, a road noise component input into the microphone 7 can be canceled making it possible to produce the active noise control effect and stabilize hands-free telephone conversation.

When there are multiple types of road surfaces between the present position of the vehicle and a destination, multiple noise spectrum patterns corresponding to the multiple types of road surfaces are transmitted beforehand from the server 4 to the in-vehicle hands-free device 2, and stored in the in-vehicle hands-free device 2. Thus, when the road surface on which the vehicle runs changes, a noise canceling signal can be outputted without delay, and the active noise control effect can be produced without interruption. As a result, hands-free telephone conversation can be continuously stabilized.

Further, the noise spectrum pattern determination unit 35 is adapted to the vehicle speed detected by a vehicle speed sensor (not shown). Multiple noise spectrum patterns are stored in the noise spectrum pattern output unit 36 in correspondence with multiple different vehicle speeds making it possible to simultaneously cancel such a noise component as wind noise produced because the vehicle speed differs even though the vehicle is running on road surfaces of a kind. More specific description will be given. When a vehicle running on an asphalt-paved open road enters an asphalt-paved highway, for example, the vehicle speed is significantly increased. The above construction makes it possible to cancel a noise component, such as wind noise, produced in such a vehicle and to further stabilize hands-free telephone conversation.

The method for road noise reduction described above is such that a noise spectrum pattern is actively controlled by the active noise control unit 14 to reduce road noise. Instead, road noise may be reduced by subjecting a noise spectrum pattern to spectrum subtraction or using an acoustic model for a noise spectrum pattern.

According to the first embodiment, the in-vehicle hands-free device 2 causes the cellular phone 3 to detect the present position of the vehicle and causes the cellular phone 3 to transmit it to the server 4. The server 4 determines a noise spectrum pattern corresponding to the road surface on which the vehicle is presently running. The above described determination is carried out based on the present position of the vehicle received from the cellular phone 3 and road information stored in the map data storage unit 34. The server selects the determined noise spectrum pattern from among multiple different noise spectrum patterns stored in correspondence with multiple different road surfaces, and transmits the selected pattern to the in-vehicle hands-free device 2 via the cellular phone 3. The in-vehicle hands-free device 2 superimposes a noise canceling signal on the received voice and outputs the composite signal to the speaker 8. The above described noise canceling signal is based on an inverted noise spectrum pattern obtained by inverting the phase of the noise spectrum pattern received from the server 4 via the cellular phone 3.

Thus, the present position of the vehicle is detected by the cellular phone 3, not by the in-vehicle hands-free device 2. The multiple different noise spectrum patterns corresponding to multiple different road surfaces are stored in the server 4, not in the in-vehicle hands-free device 2. Of the multiple different noise spectrum patterns, a noise spectrum pattern corresponding to the road surface on which the vehicle is presently running is determined by the server 4, not by the in-vehicle hands-free device 2. Thus, the present position of the vehicle or a function of storing noise spectrum patterns for determination for achieving the active noise control effect can be determined and achieved and road noise can be appropriately reduced in an in-vehicle device independent of detecting the position.

Since the multiple different noise spectrum patterns are stored in the server 4 in correspondence with multiple different road surfaces, a large storage capacity can be ensured for noise spectrum patterns. Since a noise canceling signal is superimposed on a transmit signal to cancel a road noise component from the transmit signal, a high-quality transmit signal with a road noise component canceled can be transmitted to the other party of telephone conversation. Further, since a transmit signal with a road noise component canceled is phonetically recognized, a high-quality transmit signal can be phonetically recognized and thus a phonetic recognition rate can be enhanced.

Second Embodiment

Figure 3B:
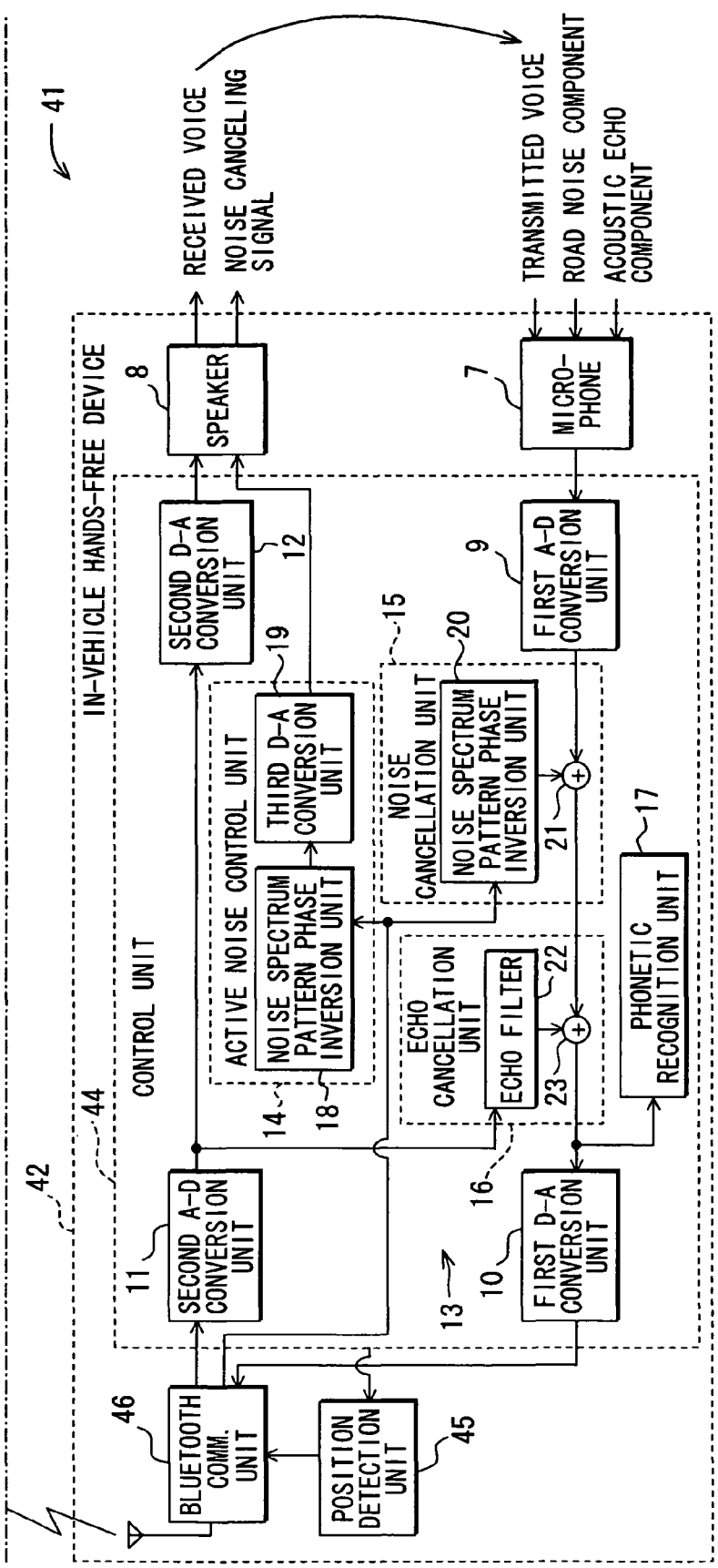
FIG. 3 is a block diagram illustrating system components in accordance with a second exemplary embodiment.

Description will now be given to a second embodiment of the invention with reference to FIG. 3. It should be noted that description of the same members as in the first embodiment will be omitted for simplicity, and the description will be focused on the differences.

As described herein above, in accordance with the first embodiment, the present position of the vehicle is detected by the cellular phone 3, multiple different noise spectrum patterns corresponding to multiple different road surfaces are stored in the server 4, and of the multiple different noise spectrum patterns, a noise spectrum pattern corresponding to the road surface on which the vehicle is presently running is determined by the server 4. Meanwhile, in accordance with the second embodiment, the in-vehicle hands-free device detects the present position of the vehicle and transmits it to the server 4.

In a communicating road noise control system 41, an in-vehicle hands-free device 42 and a cellular phone 43 can communicate with each other via, for example, a Bluetooth® protocol or other short range or proximity-based protocol, and the cellular phone 43 and the server 4 can communicate with each other in a wide area via a wide area network. The in-vehicle hands-free device 42 includes a position detection unit 45 having the same functions as those of the position detection unit 31 of the cellular phone 3 described in relation to the first embodiment. It should be noted that the position detection unit 45 can correspond to the present position detecting means in accordance with the invention. A control unit 44 outputs a present position detection request to the position detection unit 45 causing the position detection unit 45 to detect the present position of the vehicle. The control unit 44 causes a Bluetooth® communication unit 46, which can act as the present position transmitting means in accordance with the invention, to transmit the detected present position of the vehicle to the cellular phone 43 and causes the cellular phone 43 to transmit the present position of the vehicle to the server 4.

When the server 4 receives the present position of the vehicle detected by the in-vehicle hands-free device 42 from the cellular phone 43, the server 4 can perform the same operation as described in relation to a first embodiment. That is, the server determines a noise spectrum pattern corresponding to the road surface on which the vehicle is presently running. The determination is carried out based on the received present position of the vehicle and road information stored in the map data storage unit 34. The server 4 selects the determined noise spectrum pattern from among the multiple different noise spectrum patterns stored in correspondence with multiple different road surfaces and transmits the selected pattern to the cellular phone 43. Then, the server 4 causes the cellular phone 43 to transmit the selected pattern to the in-vehicle hands-free device 42.

According to the second embodiment, the in-vehicle hands-free device 42 detects the present position of the vehicle and causes the cellular phone 43 to transmit the detected position to the server 4. The server 4 determines a noise spectrum pattern corresponding to the road surface on which the vehicle is presently running. The above described determination is carried out based on the present position of the vehicle received from the cellular phone 43 and road information stored in the map data storage unit 34. The server 4 selects the determined noise spectrum pattern from among the multiple different noise spectrum patterns stored in correspondence with multiple different road surfaces, and transmits the selected pattern to the in-vehicle hands-free device 42 via the cellular phone 43. The in-vehicle hands-free device 42 superimposes a noise canceling signal on the received voice signal and outputs the composite signal to the speaker 8. The noise canceling signal is based on an inverted noise spectrum pattern obtained by inverting the phase of the noise spectrum pattern received from the server 4 via the cellular phone 43.

Thus, the multiple different noise spectrum patterns corresponding to multiple different road surfaces are stored in the server 4, not in the in-vehicle hands-free device 42. Further, of the multiple different noise spectrum patterns, a noise spectrum pattern corresponding to the road surface on which the vehicle is presently running is determined by the server 4, not by the in-vehicle hands-free device 42. Thus, the active noise control effect can be appropriately produced and road noise can be appropriately reduced even when noise spectrum patterns for determination are not locally stored.

Third Embodiment

Figure 4B:
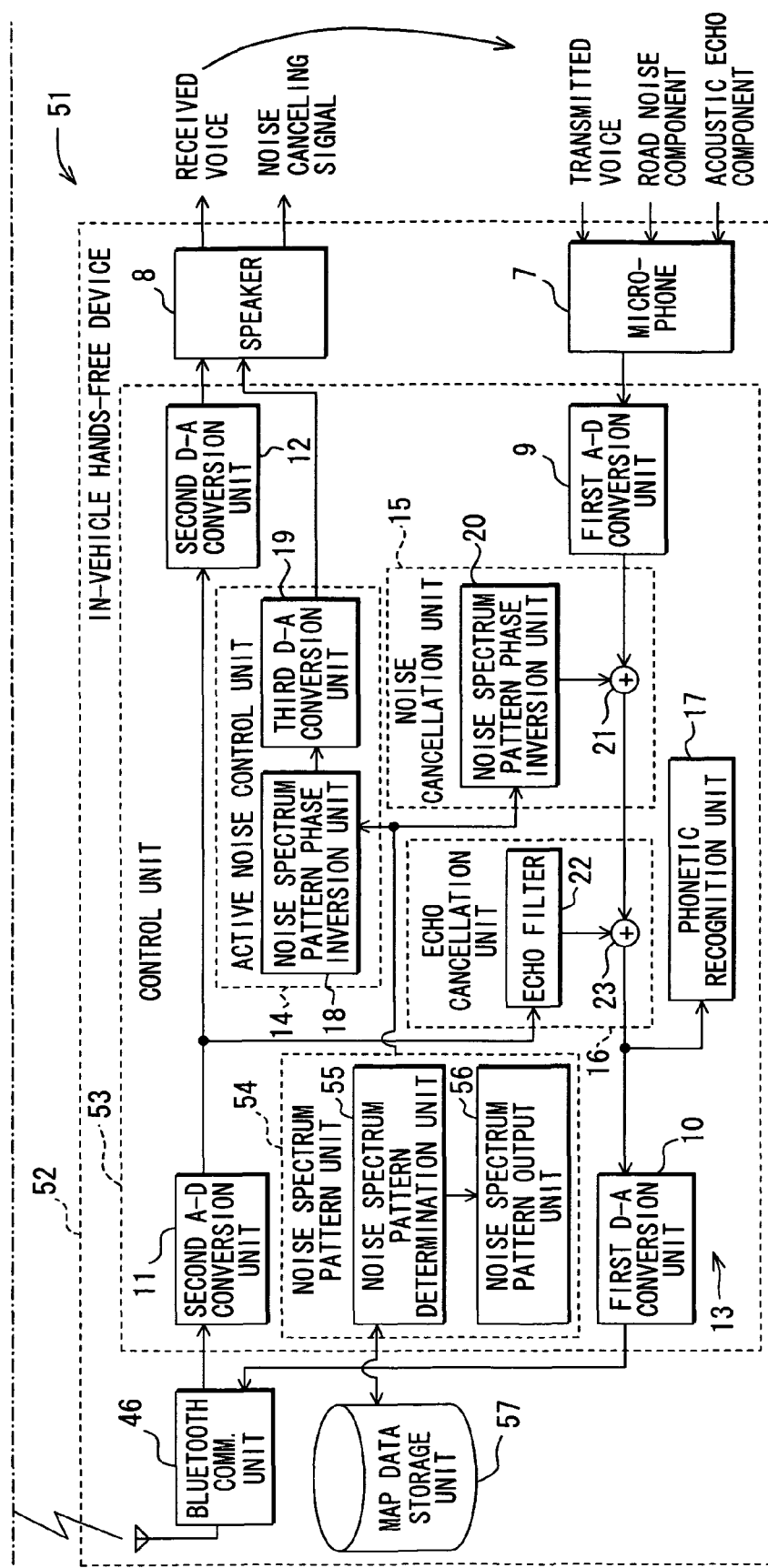
FIG. 4 is a block diagram illustrating system components in accordance with a third exemplary embodiment.

Description will now be given to a third embodiment of the invention with reference to FIG. 4. The description of the same members as in the first embodiment will be omitted, and description will be focused on the differences. In accordance with a third embodiment, the in-vehicle hands-free device acquires the present position of the vehicle from the cellular phone and determines a noise spectrum pattern.

In a communicating road noise control system 51, an in-vehicle hands-free device 52 and the cellular phone 3 can communicate with each other via, for example, a Bluetooth® protocol or other short range or proximity-based protocol.

The in-vehicle hands-free device 52 includes a noise spectrum pattern unit 54, a noise spectrum pattern determination unit 55, a noise spectrum pattern output unit 56, and a map data storage unit 57 having the same functions as those of the noise spectrum pattern unit 32, noise spectrum pattern determination unit 35, noise spectrum pattern output unit 36, and map data storage unit 34 of the server 4 described in relation to a first embodiment. A control unit 53, which can act as present position acquiring means in accordance with the invention, outputs a present position detection request from the Bluetooth® communication unit 46 to the cellular phone 3, causes the position detection unit 31 of the cellular phone 3 to detect the present position of the vehicle, receives the detected present position of the vehicle by the Bluetooth® communication unit 46, and thereby acquires the present position of the vehicle from the cellular phone 3.

After acquiring the present position of the vehicle from the cellular phone 3, the control unit 53 determines a noise spectrum pattern corresponding to the road surface on which the vehicle is presently running based on the acquired present position of the vehicle and road information stored in the map data storage unit 57. The control unit 53 selects the determined noise spectrum pattern from among the multiple different noise spectrum patterns stored in correspondence with multiple different road surfaces and outputs the selected pattern.

According to a third embodiment, the in-vehicle hands-free device 52 acquires the present position of the vehicle from the cellular phone 3 and determines a noise spectrum pattern corresponding to the road surface on which the vehicle is presently running based on the acquired present position of the vehicle and road information stored in the map data storage unit 57. The in-vehicle hands-free device superimposes a noise canceling signal on received voice and outputs the composite signal to the speaker 8. The above described noise canceling signal is based on an inverted noise spectrum pattern obtained by inverting the phase of the determined noise spectrum pattern among the multiple different noise spectrum patterns stored in correspondence with multiple different road surfaces.

Thus, the present position of the vehicle is detected by the cellular phone 3, not by the in-vehicle hands-free device 52. As a result, it is possible, even with a construction that does not detect the present position of the vehicle, to appropriately produce the active noise control effect and appropriately reduce road noise by taking the same measure as described in the first aspect.

Fourth Embodiment

Figure 5:
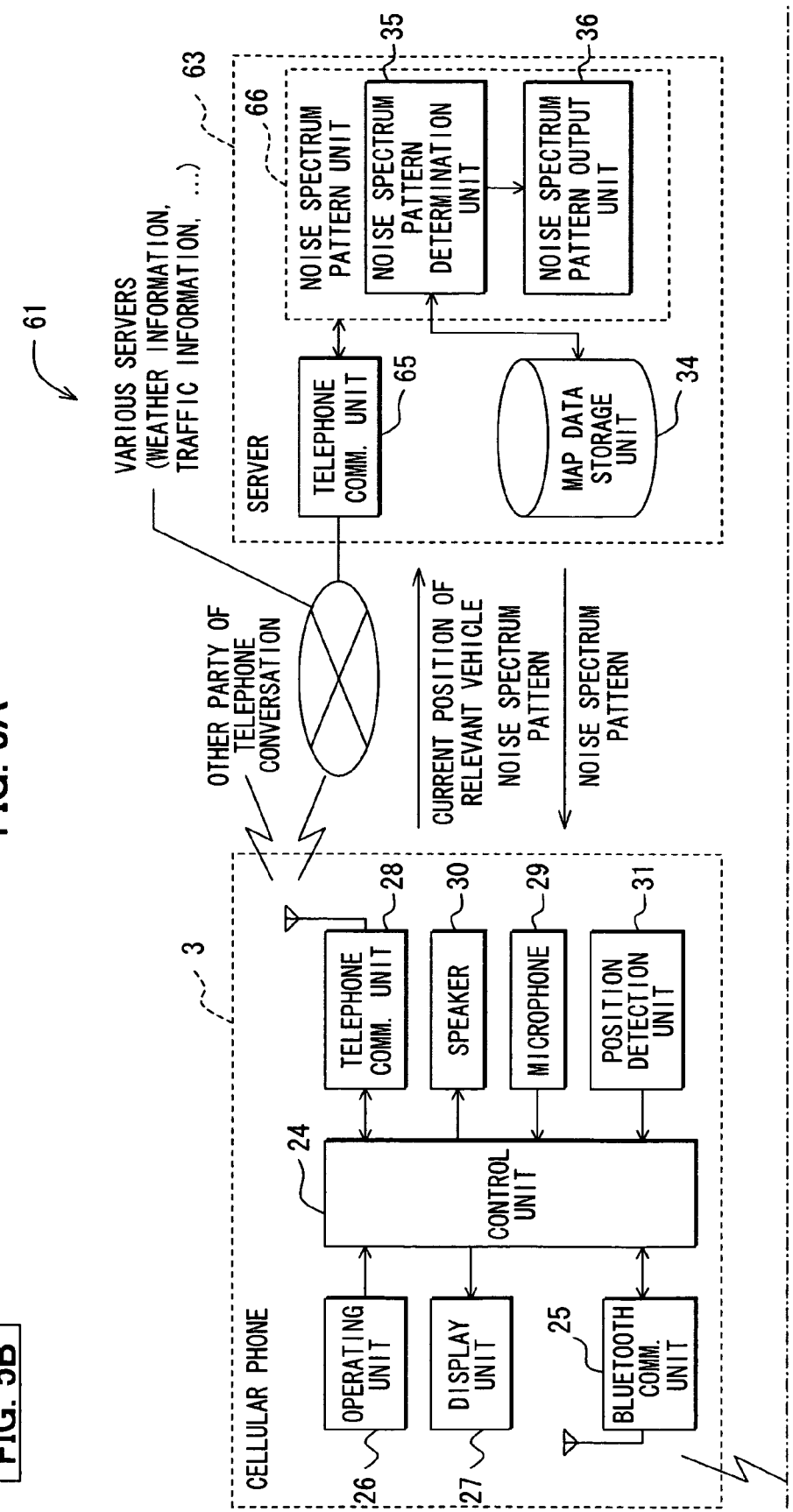
FIG. 5 is a functional block diagram illustrating system components in accordance with a fourth exemplary embodiment.
Figure 5B:
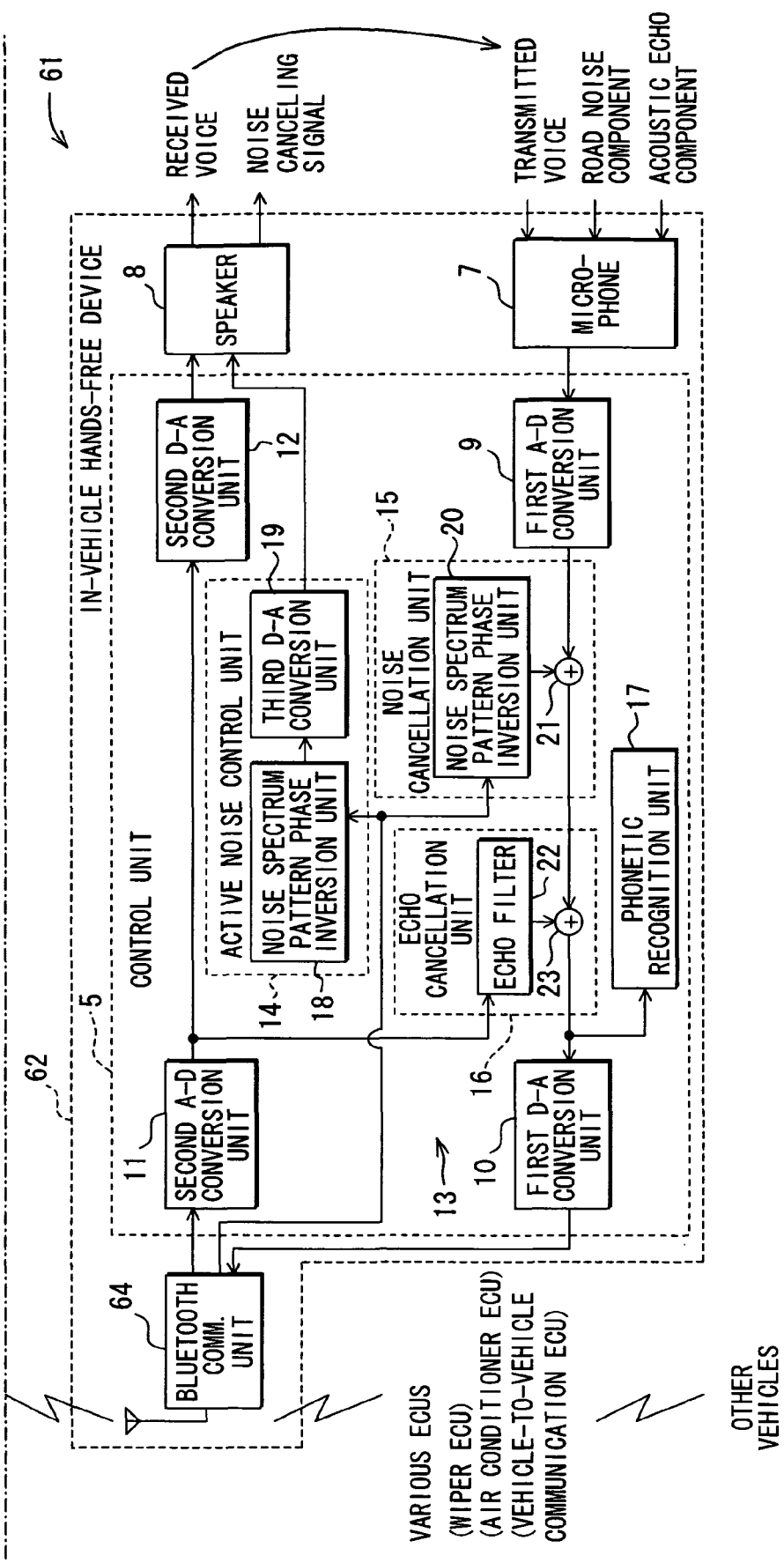
Figure 6:
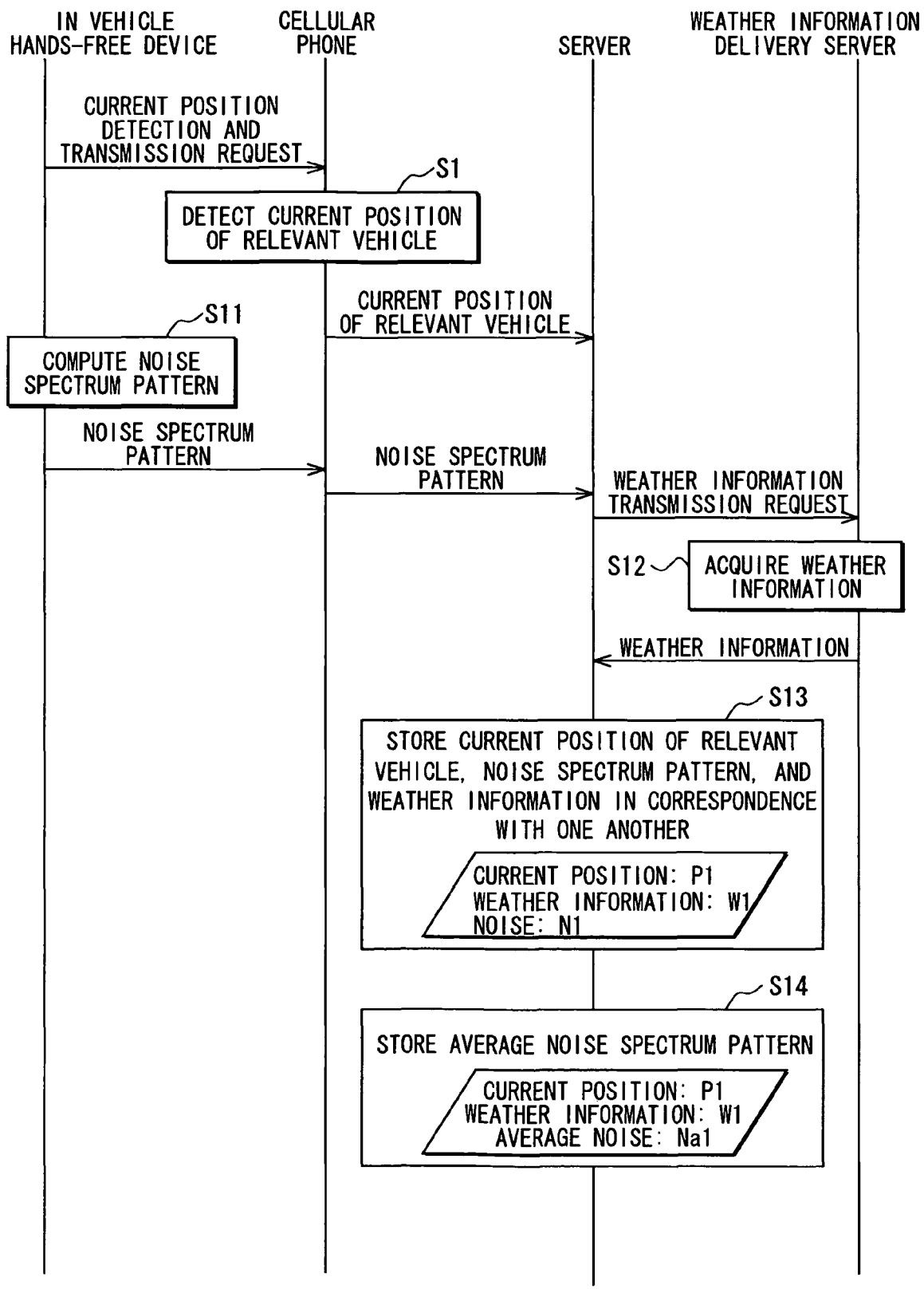
FIG. 6 is an operational flow diagram illustrating an exemplary sequence of operation in accordance with various embodiments and alternative exemplary embodiments.
Figure 7:
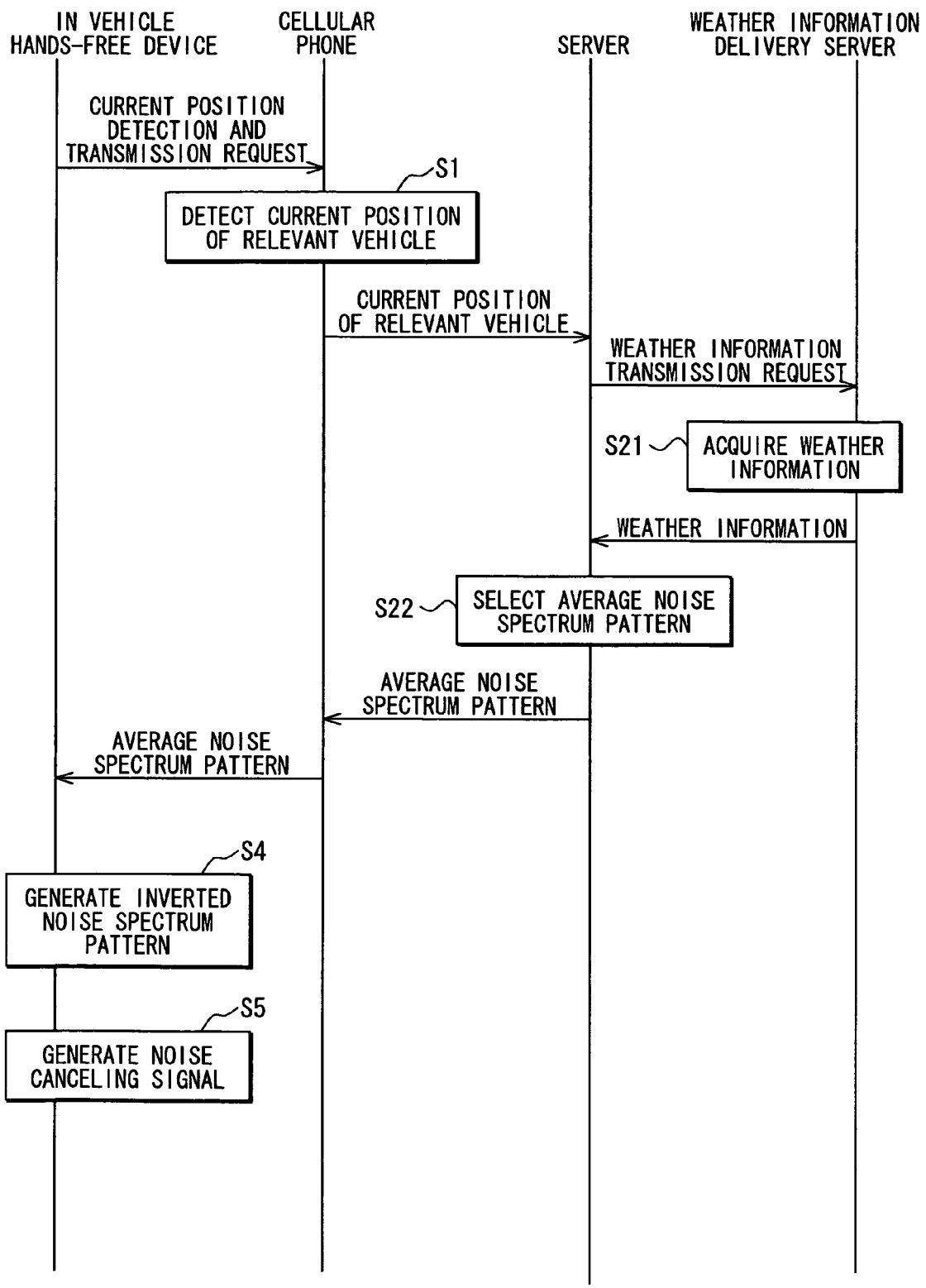
FIG. 7 is an operational flow diagram illustrating an exemplary sequence of operation in accordance with various embodiments and alternative exemplary embodiments.

Description will be given to a fourth embodiment of the invention with reference to FIG. 5 to FIG. 7. The description of the same members as in the telephone communication unit 65. A non-stationary component can be canceled leaving a stationary component and thereby optimizing the noise spectrum pattern as will be described in greater detail. The noise spectrum pattern unit 66 analyzes, for example, by gathering statistic about multiple noise spectrum patterns received from the in-vehicle hands-free device 62 at a common point by the telephone communication unit 65. A stationary component, such as road noise, is left and non-stationary components, such as conversation sound from occupants, operating noise from wiper or air conditioner, engine sound and exhaust sound from other vehicles, are canceled thereby optimizing the noise spectrum pattern. It should be noted that during the analysis, the averages of the noise spectrum patterns are taken. The noise spectrum pattern unit 66 receives various information from various servers, such as a weather information delivery server for delivering weather information, a traffic information delivery server for delivering traffic information, and the like, via a communication network.

Description will now be given to the action of the above-mentioned construction with reference to FIG. 6 and FIG. 7. It will be assumed that the server 63 receives weather information transmitted from a weather information delivery server.

In the above described case, the server 63 optimizes a noise spectrum pattern as described below. The in-vehicle hands-free device 62 transmits a present position detection and transmission request to the cellular phone 3, and then computes a noise spectrum pattern at S11. Whereupon the computed noise spectrum pattern is transmitted to the cellular phone 3. When the cellular phone 3 receives the present position detection and transmission request from the in-vehicle hands-free device 2, the present position of the first embodiment will be omitted for simplicity, and description will be focused on the differences. In accordance with the first to third embodiments, the in-vehicle hands-free device does not transmit a noise spectrum pattern to the server. Meanwhile, in accordance with the fourth embodiment, the in-vehicle hands-free device does transmit a noise spectrum pattern to the server.

In a communicating road noise control system 61, an in-vehicle hands-free device 62 and the cellular phone 3 can communicate with each other and the cellular phone 3 and a server 63 can communicate with each other in a wide area via a wide area network. In the in-vehicle hands-free device 62, a Bluetooth® communication unit 64, which can act as noise spectrum pattern transmitting means and additional information acquiring means in accordance with the invention, communicates with various electronic control units (ECUs) such as a wiper ECU, an air conditioner ECU, a vehicle-to-vehicle communication ECU and the like via a Bluetooth® protocol or other proximity based protocol. By communicating with the ECUs, the Bluetooth® communication unit 64 acquires varied additional information such as an on/off state of wiper operation, on/off state of air conditioner operation, engine sound and exhaust sound from other vehicles running around the vehicle, and the like, and transmits a noise spectrum affixed with the acquired additional information to the server 63.

In the server 63, a telephone communication unit 65, which can act as noise spectrum pattern receiving means in accordance with the invention, receives the noise spectrum pattern transmitted from the in-vehicle hands-free device 62. A noise spectrum pattern unit 66, which can act as noise spectrum pattern optimizing means in accordance with the invention, analyzes the noise spectrum pattern received from the in-vehicle hands-free device 62 by the vehicle can be detected, for example, by the cellular phone 3, at S1. The detected present position of the vehicle is transmitted to the server 4. Upon receipt of the noise spectrum pattern from the in-vehicle hands-free device 2, the cellular phone 3 transmits the received noise spectrum pattern to the server 63.

When the server 63 receives the present position of the vehicle and the noise spectrum pattern from the cellular phone 3, a weather information transmission request is transmitted to the weather information delivery server. When the weather information delivery server receives the weather information transmission request from the server 63, weather information is acquired at S12 corresponding to the present position of the cellular phone 3 that transmitted the weather information transmission request. Then, the acquired weather information is transmitted to the server 63.

When the server 63 receives the weather information from the weather information delivery server, the present position of the vehicle, the noise spectrum pattern received from the cellular phone 3, and the weather information received from the weather information delivery server can be stored in association with one another at S13. The server 63 analyzes the data by the present position of the vehicle, noise spectrum pattern, and weather information. A stationary component, such as road noise, is left and non-stationary components, such as conversation sound from occupants, operating noise from wiper or air conditioner, engine sound and exhaust sound from other vehicles is canceled. An average noise spectrum pattern is generated. By removing non-stationary noise components, the noise spectrum patterns are thereby optimized. The present position of the vehicle, average noise spectrum pattern, and weather information are stored in correspondence with one another at S14.

The server 63 transmits the optimized noise spectrum pattern to the in-vehicle hands-free device 62 as described below. The in-vehicle hands-free device 62 transmits a present position detection and transmission request to the cellular phone 3. When the request is received, the cellular phone 3 detects the present position of the vehicle at S1 and the detected present position of the vehicle is transmitted to the server 63.

When the server 63 receives the present position of the vehicle, a weather information transmission request is transmitted to the weather information delivery server. When the request is received, the weather information delivery server acquires weather information corresponding to the present position of the cellular phone 3 that transmitted the weather information transmission request at S21. The acquired weather information is then transmitted to the server 63.

When the weather information is received by the server 63, the average noise spectrum pattern, which is stored in correspondence with the present position of the vehicle received from the cellular phone 3 and the weather information received from the weather information delivery server, is selected at S22. The selected average noise spectrum pattern is transmitted to the cellular phone 3. When received by the cellular phone 3 the received average noise spectrum pattern is transmitted to the in-vehicle hands-free device 2. When received by the in-vehicle hands-free device 2 the received average noise spectrum pattern are input to the active noise control unit 14 and the noise cancellation unit 15. Then, at S4, an inverted noise spectrum pattern is generated at the active noise control unit 14 and at the noise cancellation unit 15 at S4. A noise canceling signal is generated at S5 based on the generated inverted noise spectrum pattern.

In the in-vehicle hands-free device 62, when a transmitted voice signal, a road noise component, and an acoustic echo component are inputted as a transmit signal from the microphone 7, the control unit 5 converts the inputted transmit signal from analog signal to digital signal at the first A-D conversion unit 9 and superimposes a noise canceling signal generated by the noise cancellation unit 15 on the transmit signal to cancel the road noise component. The control unit 5 then cancels the acoustic echo component at the echo cancellation unit 16 and converts the digital signal into an analog signal at the first D-A conversion unit 10. The control unit then causes the Bluetooth® communication unit 65 to transmit a transmit signal that approximates the above described transmitted voice signal to the other party of telephone conversation via the cellular phone 3.

It should be noted that the above construction may be modified such that, at the server 63, the present position of the vehicle is received from the in-vehicle hands-free device 62. In response to the reception of a noise spectrum pattern, the noise spectrum pattern received from the in-vehicle hands-free device 62 is optimized. The average noise spectrum pattern corresponding to the present position of the vehicle is then transmitted to the in-vehicle hands-free device 62. The foregoing is a description of a construction that at the server 63, weather information is acquired from the weather information delivery server and an average noise spectrum pattern is computed and stored with respect to each piece of acquired weather information such as fine weather, rainy weather, and the like. Instead, in accordance with the invention traffic information is acquired from a traffic information delivery server and an average noise spectrum pattern is computed and stored with respect to each piece of the acquired traffic information, such as a degree of traffic, a traffic jam, information about road work in a given section, and the like.

According to the fourth embodiment, the same operation as in the first embodiment is carried out. That is, the multiple different noise spectrum patterns corresponding to multiple different road surfaces are stored in the server 63, not in the in-vehicle hands-free device 62. Further, of the multiple different noise spectrum patterns, a noise spectrum pattern corresponding to the road surface on which the vehicle is presently running is determined by the server 63, not by the in-vehicle hands-free device 62. Therefore, the active noise control effect can be appropriately produced and road noise can be appropriately reduced even when noise spectrum patterns for determination are not stored locally. Since an average noise spectrum pattern with a stationary component left and a non-stationary component canceled is transmitted to the in-vehicle road noise controller 62, it is possible to more appropriately reduce road noise and thus enhance accuracy.

As mentioned above, the present embodiment is constructed based on the first embodiment, that is, the present position of the vehicle is detected by the cellular phone 3. Alternatively, the present embodiment may be constructed based on the second embodiment, that is, the present position of the vehicle is detected by the in-vehicle hands-free device 42. Accordingly, the same action and effect can be obtained by causing the in-vehicle hands-free device 42 to transmit a noise spectrum pattern to the server 4.

Other Embodiments

It will be appreciated that the invention is not limited to the above described embodiments, and can be modified or expanded, for example, as described herein below.

The external device need not be a cellular phone having a position detection function, and may be any other device, such as a personal digital assistant or an automobile navigation system, having a position detection function. Alternatively, the external device may be an automobile navigation system mounted in any other vehicle running in the vicinity of the vehicle. In such a case, the automobile navigation system mounted in the other vehicle can be caused to detect the present position of the vehicle by carrying out vehicle-to-vehicle communication between the automobile navigation system in the vehicle and that in the other vehicle. When the external device is an automobile navigation system, the position detection unit may be so constructed that it uses a GPS receiver, a geomagnetic sensor, a gyroscope, a distance sensor, or the like together. Further, the invention may be so constructed that the in-vehicle hands-free device and an external device or various ECUs are wirelessly connected together in accordance with any other wireless or wired communication standard or combination of standards.

What is claimed is:

1. A communicating road noise control system including an in-vehicle road noise controller and a server that communicate with each other via a communication network, the in-vehicle road noise controller comprising:
   a voice inputting means disposed in a compartment of the vehicle for inputting a voice frequency signal;
   a voice outputting means disposed in the vehicle compartment for outputting a received voice signal;
   a voice relaying means for outputting, as a transmit signal, the voice frequency signal inputted from the voice inputting means to a telephone means and for outputting the received signal inputted from the telephone means to the voice outputting means;
   a present position detection and transmission instructing means for causing an external device to detect the present position of the vehicle and causing the external device to transmit the present position of the vehicle to the server;
   a noise spectrum pattern transmitting means for transmitting a noise spectrum pattern to the server;
   a noise spectrum pattern receiving means for receiving the noise spectrum pattern from the server; and
   a road noise reducing means for reducing road noise based on the noise spectrum pattern received by the noise spectrum pattern receiving means; and
   the server comprising:
   a present position receiving means for receiving the present position of the vehicle from the external device;
   a noise spectrum pattern receiving means for receiving the noise spectrum pattern from the in-vehicle road noise controller;
   a noise spectrum pattern optimizing means for analyzing the noise spectrum pattern received by the noise spectrum pattern receiving means to leave a stationary component and cancel a non-stationary component and thereby optimizing the noise spectrum pattern;
   a noise spectrum pattern determining means for determining the noise spectrum pattern corresponding to the road surface on which the vehicle is presently running based on the present position of the vehicle received by the present position receiving means and road information stored in a map data storing means;
   a noise spectrum pattern outputting means for storing a plurality of different noise spectrum patterns optimized by the noise spectrum pattern optimizing means in correspondence with a plurality of different road surfaces and for selecting the noise spectrum pattern determined by the determining means from among the plurality of noise spectrum patterns and outputting the noise spectrum pattern; and
   a noise spectrum pattern transmitting means for transmitting the noise spectrum pattern outputted from the noise spectrum pattern outputting means to the in-vehicle road noise controller.

2. The communicating road noise control system according to claim 1,
   wherein the in-vehicle road noise controller includes:
   an additional information acquiring means for acquiring additional information that influences the noise spectrum pattern, and
   wherein the noise spectrum pattern transmitting means transmits the noise spectrum pattern including the additional information to the server.

3. The communicating road noise control system of claim 1,
   wherein the road noise reducing means includes an active noise controlling means for:
   superimposing a noise canceling signal on the received signal, the noise canceling signal based on an inverted noise spectrum pattern obtained by inverting the phase of the noise spectrum pattern received by the noise spectrum pattern receiving means to form a composite signal; and
   outputting the composite signal from the voice outputting means and thereby reducing road noise.

4. The communicating road noise control system of claim 3, comprising:
   a noise canceling means for superimposing a noise canceling signal on the transmitted signal, the noise canceling signal based on an inverted noise spectrum pattern, obtained by inverting the phase of the noise spectrum pattern received by the noise spectrum pattern receiving means, on a transmit signal and thereby canceling a road noise component from the transmit signal.

5. The communicating road noise control system of claim 1, wherein the road noise reducing means subjects the noise spectrum pattern to spectrum subtraction and thereby reduces road noise.

6. The communicating road noise control system of claim 1, wherein the noise spectrum pattern used by the road noise reducing means includes an acoustic model thereby reducing road noise.

7. A communicating road noise control system including an in-vehicle road noise controller and a server that communicate with each other via a communication network, the in-vehicle road noise controller comprising:
   a voice inputting means disposed in a compartment of the vehicle for inputting a voice frequency signal;
   a voice outputting means disposed in the vehicle compartment for outputting a received signal;
   a voice relaying means for outputting, as a transmit signal, the voice frequency signal inputted from the voice inputting means to a telephone means and for outputting the received signal inputted from the telephone means to the voice outputting means;
   a present position detecting means for detecting the present position of the vehicle;
   a present position transmitting means for transmitting the present position of the vehicle detected by the present position detecting means to the server;
   a noise spectrum pattern transmitting means for transmitting a noise spectrum pattern to the server;
   a noise spectrum pattern receiving means for receiving the noise spectrum pattern from the server; and
   a road noise reducing means for reducing road noise based on the noise spectrum pattern received by the noise spectrum pattern receiving means, and
   the server comprising:
   a present position receiving means for receiving the present position of the vehicle from the in-vehicle road noise controller;
   a noise spectrum pattern receiving means for receiving the noise spectrum pattern from the in-vehicle road noise controller;
   a noise spectrum pattern optimizing means for analyzing the noise spectrum pattern received by the noise spectrum pattern receiving means to leave a stationary component and cancel a non-stationary component and thereby optimizing the noise spectrum pattern;

a noise spectrum pattern determining means for determining the noise spectrum pattern corresponding to the road surface on which the vehicle is presently running based on the present position of the vehicle received by the present position receiving means and road information stored in a map data storing means;

a noise spectrum pattern outputting means for storing a plurality of different noise spectrum patterns optimized by the noise spectrum pattern optimizing means in correspondence with a plurality of different road surfaces and for selecting the noise spectrum pattern determined by the noise spectrum pattern determining means from among the plurality of different noise spectrum patterns and outputting the noise spectrum pattern; and a noise spectrum pattern transmitting means for transmitting the noise spectrum pattern outputted from the noise spectrum pattern outputting means to the in-vehicle road noise controller.

8. The communicating road noise control system according to claim 7,
wherein the in-vehicle road noise controller includes:
an additional information acquiring means for acquiring additional information that influences the noise spectrum pattern, and
wherein the noise spectrum pattern transmitting means transmits the noise spectrum pattern including the additional information to the server.

9. The communicating road noise control system of claim 7,
wherein the road noise reducing means includes an active noise controlling means for:
superimposing a noise canceling signal on the received signal, the noise canceling signal based on an inverted noise spectrum pattern obtained by inverting the phase of the noise spectrum pattern received by the noise spectrum pattern receiving means to form a composite signal; and
outputting the composite signal from the voice outputting means and thereby reducing road noise.

10. The communicating road noise control system of claim 9, comprising:
a noise canceling means for superimposing a noise canceling signal on the transmitted signal, the noise canceling signal based on an inverted noise spectrum pattern, obtained by inverting the phase of the noise spectrum pattern received by the noise spectrum pattern receiving means, on a transmit signal and thereby canceling a road noise component from the transmit signal.

11. The communicating road noise control system of claim 7, wherein the road noise reducing means subjects the noise spectrum pattern to spectrum subtraction and thereby reduces road noise.

12. The communicating road noise control system of claim 7, wherein the noise spectrum pattern used by the road noise reducing means includes an acoustic model thereby reducing road noise.

13. A server in a communicating road noise control system, the server communicating with an in-vehicle road noise controller so constructed that an external device is caused to transmit the present position of the vehicle to the server and road noise is reduced based on a noise spectrum pattern received from the server, the server comprising:
a present position receiving means for receiving the present position of the vehicle from the in-vehicle road noise controller;

a noise spectrum pattern receiving means for receiving the noise spectrum pattern from the in-vehicle road noise controller;

a noise spectrum pattern optimizing means for analyzing the noise spectrum pattern received by the noise spectrum pattern receiving means to leave a stationary component and cancel a non-stationary component and thereby optimizing the noise spectrum pattern;

a noise spectrum pattern determining means for determining the noise spectrum pattern corresponding to the road surface on which the vehicle is presently running based on the present position of the vehicle received by the present position receiving means and road information stored in a map data storing means;

a noise spectrum pattern outputting means for storing a plurality of different noise spectrum patterns optimized by the noise spectrum pattern optimizing means in correspondence with a plurality of different road surfaces and for selecting the noise spectrum pattern determined by the noise spectrum pattern determining means from among the plurality of different noise spectrum patterns and outputting the noise spectrum pattern; and a noise spectrum pattern transmitting means for transmitting the noise spectrum pattern outputted from the noise spectrum pattern outputting means to the in-vehicle road noise controller.

14. A server in a communicating road noise control system, the server communicating with an in-vehicle road noise controller so constructed that the present position of the vehicle is transmitted to the server and road noise is reduced based on a noise spectrum pattern received from the server, the server comprising:
a present position receiving means for receiving the present position of the vehicle from the in-vehicle road noise controller;

a noise spectrum pattern receiving means for receiving the noise spectrum pattern from the in-vehicle road noise controller;

a noise spectrum pattern optimizing means for analyzing the noise spectrum pattern received by the noise spectrum pattern receiving means to leave a stationary component and cancel a non-stationary component and thereby optimizing the noise spectrum pattern;

a noise spectrum pattern determining means for determining the noise spectrum pattern corresponding to the road surface on which the vehicle is presently running based on the present position of the vehicle received by the present position receiving means and road information stored in a map data storing means;

a noise spectrum pattern outputting means for storing a plurality of different noise spectrum patterns optimized by the noise spectrum pattern optimizing means in correspondence with a plurality of different road surfaces and for selecting the noise spectrum pattern determined by the noise spectrum pattern determining means from among the plurality of different noise spectrum patterns and outputting the noise spectrum pattern; and a noise spectrum pattern transmitting means for transmitting the noise spectrum pattern outputted from the noise spectrum pattern outputting means to the in-vehicle road noise controller.

* * * * *